United States Patent [19]

Wittmer

[11] Patent Number: 5,192,217

[45] Date of Patent: Mar. 9, 1993

[54] ELECTRICAL BUSWAY DISTRIBUTION SYSTEM HAVING PROVISIONS FOR PREVENTING UNINTENTIONAL CONTACT WITH LIVE CONDUCTORS AT TAP-OFF LOCATIONS

[75] Inventor: Daniel L. Wittmer, Fredericktown, Ohio

[73] Assignee: Square D Company, Palatine, Ill.

[21] Appl. No.: 816,507

[22] Filed: Dec. 31, 1991

[51] Int. Cl.⁵ .............................................. H01R 4/60
[52] U.S. Cl. ..................................... 439/211; 439/135
[58] Field of Search ................ 439/148, 149, 207–212, 439/135; 174/68 B, 88 B, 99 B

[56] References Cited

U.S. PATENT DOCUMENTS

| 4,017,137 | 4/1977 | Parks | 439/211 |
| 4,421,367 | 12/1983 | Shannon et al. | 439/211 |
| 4,714,431 | 12/1987 | McGoldrick et al. | 439/212 |
| 4,781,608 | 11/1988 | Hillman | 439/212 |

FOREIGN PATENT DOCUMENTS 2218578 10/1989 United Kingdom ................ 439/211

Primary Examiner—David L. Pirlot
Attorney, Agent, or Firm—D. Russell Stacey

[57] ABSTRACT

The improved plug-in base assembly of the present invention provides a means for complying with European Health and Safety requirements and particularly the requirement of IEC 439-1 paragraph 7.4.2.2. Subparagraph 7.4.2.2.3 generally requires that live parts be shielded such that they cannot be contacted when a door or cover normally protecting them is opened or removed. This requirement provides additional protection to the installer of a tap-off device against unintentional contact with the uninsulated edges of bus bars exposed through the plug-in openings. The additional protection is provided by a finger barrier which covers the normally exposed uninsulated edge of a bus bar. The finger barrier permits the electrical connectors of a tap-off unit to pass through the plug-in opening and make an electrical connection while preventing any unintentional contact of the installers fingers with the uninsulated edge of the bus bar.

11 Claims, 3 Drawing Sheets

ELECTRICAL BUSWAY DISTRIBUTION SYSTEM HAVING PROVISIONS FOR PREVENTING UNINTENTIONAL CONTACT WITH LIVE CONDUCTORS AT TAP-OFF LOCATIONS

FIELD OF THE INVENTION

This invention relates to the technology of electrical busway distribution systems, and in certain respects to busway distribution systems having provisions for the connection of tap-off devices.

BACKGROUND OF THE INVENTION

The present invention is directly related to and is an improvement of the improved plug-in base assembly disclosed in U.S. Pat. No. 4,714,431, issued Dec. 22, 1987. The improved plug-in base assembly of U.S. Pat. No. 4,714,431 is directly associated with the electrical distribution systems disclosed in U.S. Pat. Nos. 4,673,229 issued Jun. 16, 1987 and 4,820,177 issued Apr. 11, 1989. Each of the previously referenced patents are assigned to the same assignee as the present invention and are incorporated by reference for the description of common features and applications.

It is common in the art of electrical distribution systems to include provisions for the installation of tap-off units at intervals along a busway housing. These provisions generally include a number of access openings spaced at set intervals along the busway housing whereby access to the bus bars enclosed therein is obtained. Each access opening includes a plug-in base made from an electrical insulating material. The plug-in base provides support for the bus bars and serves as a mounting platform for the tap-off unit. Each plug-in base includes a number of plug-in openings through which the electrical connection of a tap-off device is made. These openings are of sufficient size to permit unintentional contact of a human finger with the exposed edge of an uninsulated bus bar positioned immediately behind the plug-in base. A door is provided for covering the outside surface of the plug-in base including the plug-in openings when no tap-off unit is installed on the base. The door is open, both immediately before the installation and after the removal of a tap-off unit. With the door open there is an increased possibility of unintentional contact with the uninsulated edges of the bus bars through the plug-in openings in the plug-in base.

SUMMARY OF THE INVENTION

An object of the present invention is to meet European Health and Safety requirements and particularly the requirements of IEC 439-1 paragraph 7.4.2.2 wherein all live parts of an electrical distribution system must be deenergized, or shielded such that they cannot be unintentionally touched when a door or cover normally protecting them is opened or removed. This requirement mandates additional protection for the installer against the possible unintentional contact with an uninsulated bus bar during the installation or removal of a tap-off unit. The present invention includes an improved base assembly as disclosed in U.S. Pat. No. 4,714,431 having four plug-in openings. Each plug-in opening provides access to an uninsulated edge and an adjacent electrical contact surface of one bus bar. The present invention provides, in one particular embodiment, a base assembly with a finger barrier made of an electrically insulating material at each plug-in opening.

The finger barrier covers the uninsulated edge of the bus bar that is normally exposed through the plug-in opening while permitting a connector of the tap-off unit to pass through the plug-in opening and make an electrical connection with the bus bar. The finger barrier reduces the possibility of unintentional contact with the uninsulated edge of a bus bar by the installers fingers.

Other features and advantages of the invention will become apparent to those skilled in the art upon review of the following detailed description, claims and drawings.

Figure 1:
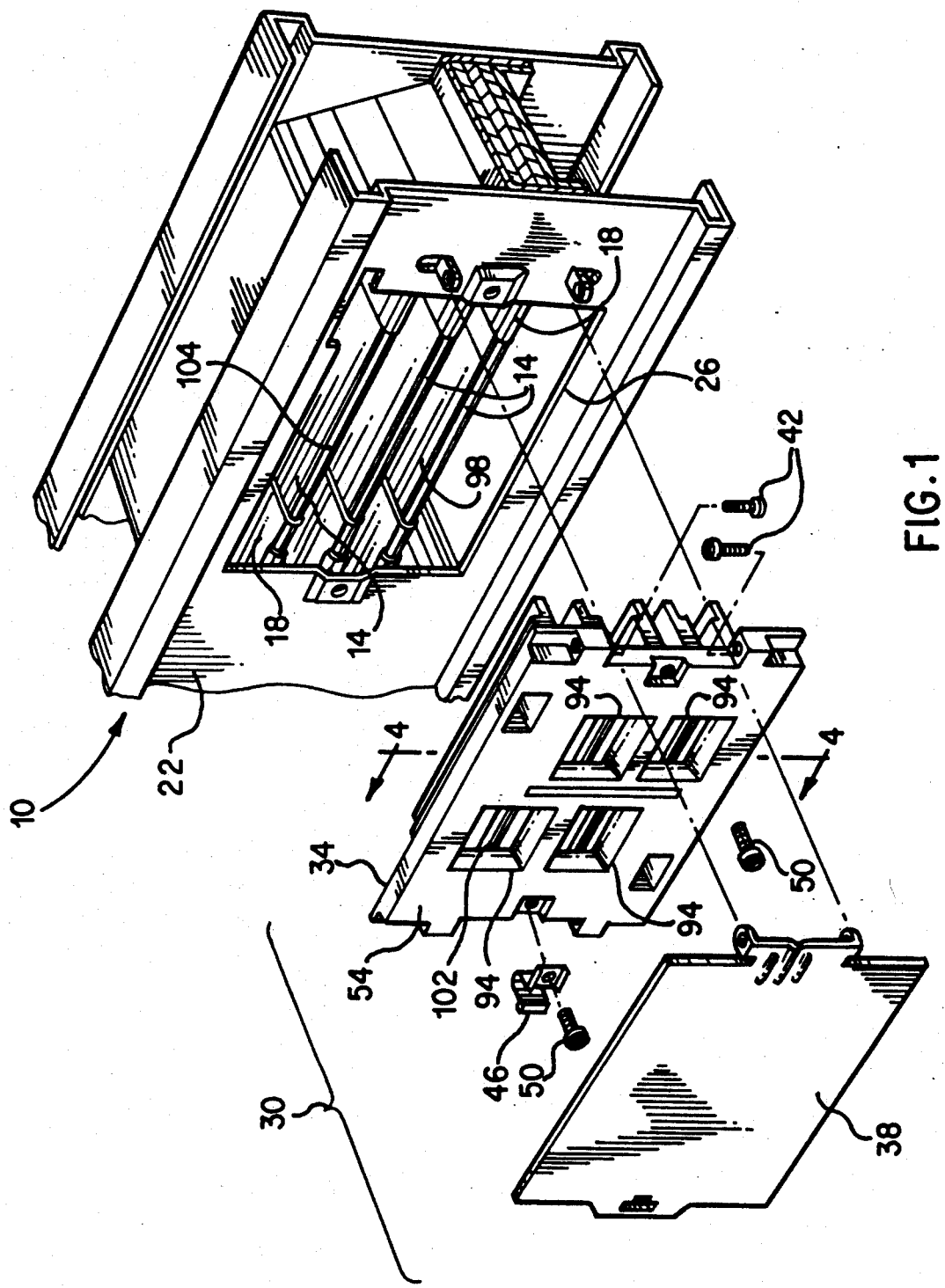
FIG. 1 is an exploded view of an electrical distribution system according o the present invention showing the plug-in base assembly with finger barriers installed.
Figure 2:
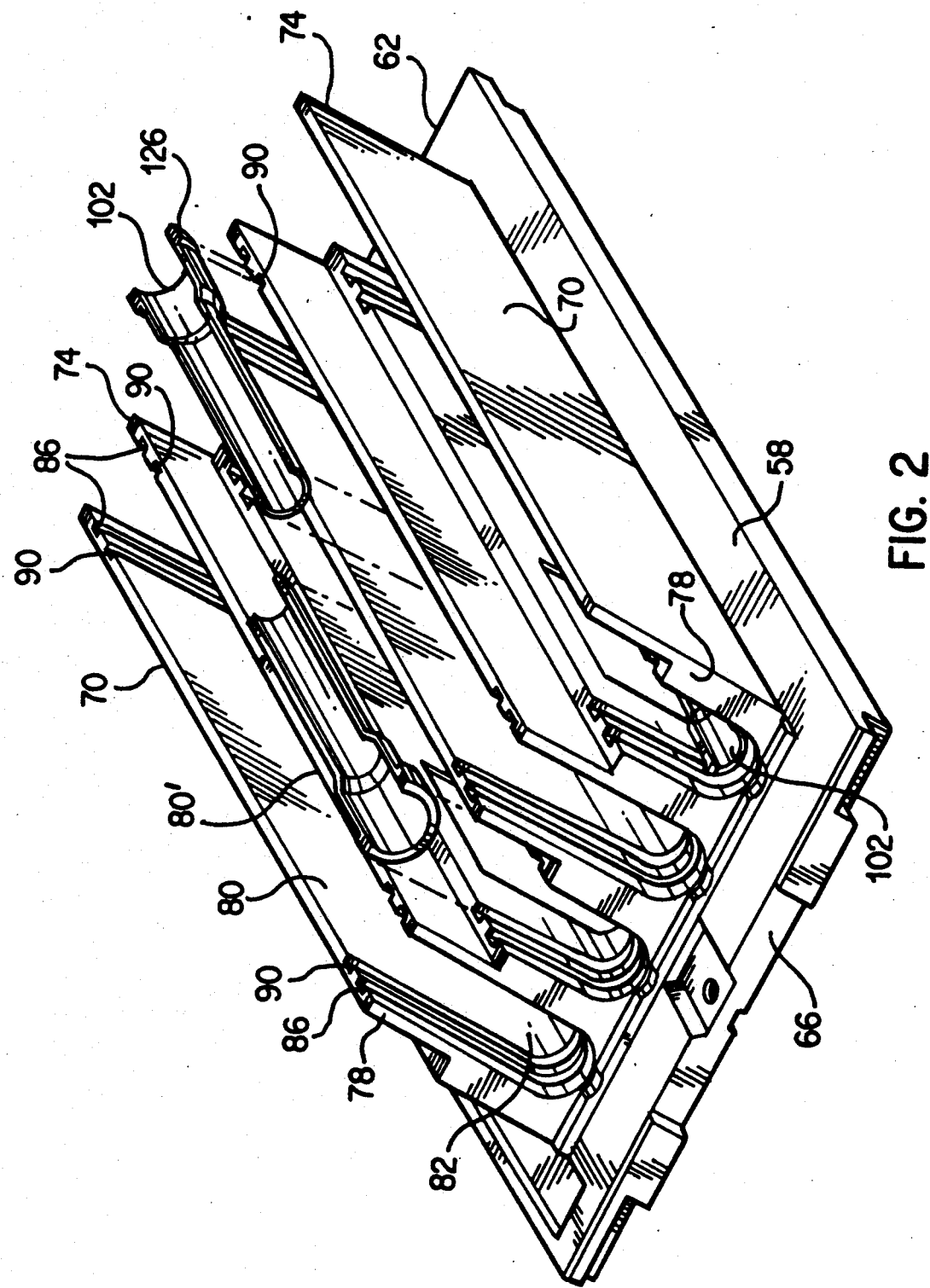
FIG. 2 is an isometric view of the back side of a plug-in base according to the present invention showing the installation of the finger barriers.
Figure 3:
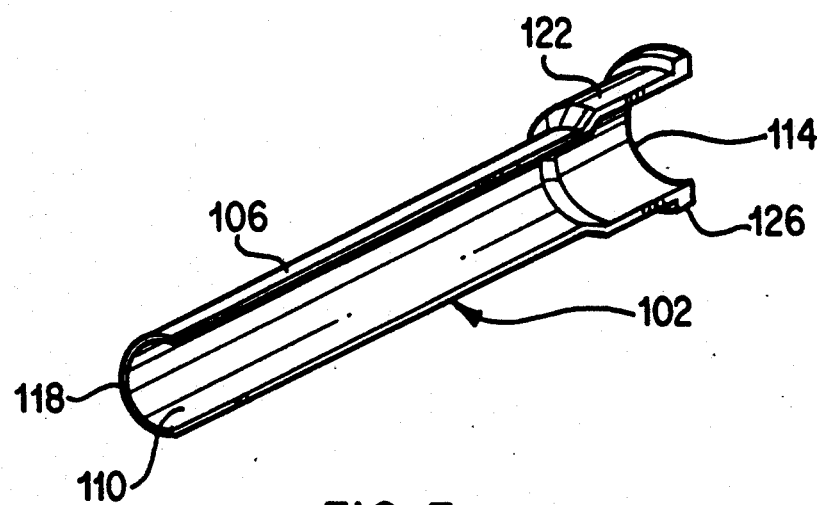
FIG. 3 is an isometric view of a finger barrier constructed in accordance with the present invention.
Figure 4:
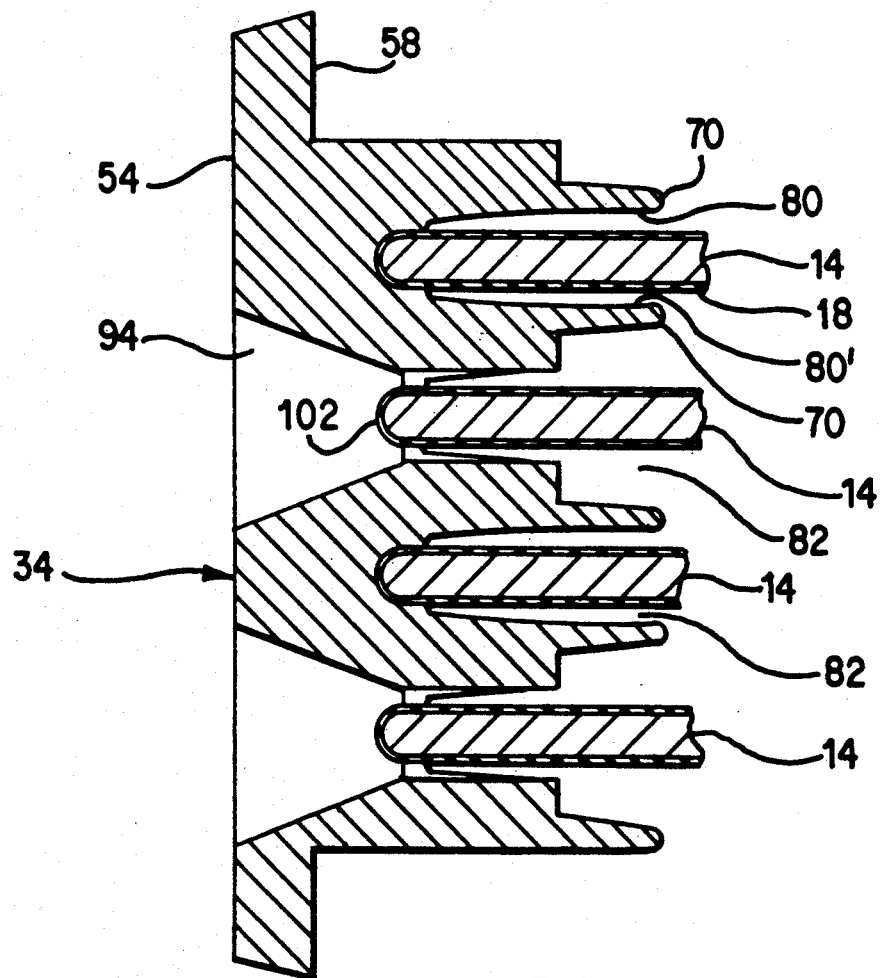
FIG. 4 is a cross-sectional view taken along line 4—4 of FIG. 1 showing the plug-in base with finger barriers of the present invention installed.

Before embodiments of the invention are explained in detail, it is to be understood that the invention is not limited in its application to the details of construction and description or illustrated in the drawings.

The invention is capable of other embodiments and of being practiced or being carried out in various other ways. Also, it is to be understood that the phraseology and terminology used herein is for the purpose of description and should not be regarded as limiting.

DESCRIPTION OF PREFERRED EMBODIMENTS

The electrical distribution system of the present invention, having provisions for installing tap-off devices, is identified generally by the reference number 10. The electrical distribution system 10 includes a plurality of bus bars 14, each covered by an electrically insulating sheath 18. The bus bars 14 are enclosed in a housing 22 which provides support and protection for the bus bars 14. A number of access openings 26 are spaced at intervals along the housing 22. The access openings 26 provide access to the bus bars 14 enclosed within the housing 22 for the purpose of connecting a tap-off unit. Each access opening 26 is provided with an improved plug-in base assembly 30 which provides support for the bus bars 14 and also serves as a platform for any tap-off unit which might be installed at that access opening 26.

Each improved plug-in base assembly 30 includes a base 34, a door 38, a pair of drive screws 42 for hingeably attaching the door 38 to the base 34, a door latch 46 for retaining the door 38 in the closed position, screws 50 for holding the door latch 46 onto the base 34 and also for holding the base 34 onto the busway housing 22. The base 34 is made from an electrically insulating material and is generally rectangular in shape. The base 34 includes a generally flat outside surface 54, an inside surface 58, a first end 62, and a second end 66. Five parallel ribs 70, each having a first end 74 and a second end 78, extend outwardly from and perpendicularly to the inside surface 58 of the base 34, along the longitudinal axis of the base 34. Each of the ribs 70 is generally rectangular in shape and includes at least one surface 80 which is in opposed relationship to at least one surface 80' of an immediately adjacent rib 70. The opposed surfaces 80 and 80' of immediately adjacent ribs 70 and an intermediate portion of the inside surface 58 define a bus bar retaining slot 82. The five ribs 70 form four bus bar retaining slots 82, one slot 82 between each pair of adjacent ribs 70. Each pair of opposed surfaces 80 and 80' and the intermediate portion of the inside surface 58 forming one bus bar retaining slot 82 include a pair of first grooves 86 and a pair of second groove 90. One of the first grooves 86 is immediately adjacent to and parallel with the first end 74 and the other of the first grooves 86 is immediately adjacent to and parallel with the second end 78. One of the second grooves 90 is immediately adjacent to and parallel with one of the first grooves 86. The other of the second grooves 90 is immediately adjacent to and parallel with the other of the first grooves 86. Each of the bus bar retaining slots 82 is of sufficient width to snugly receive one bus bar 14. The base 34 also includes four generally square plug-in openings 94 which provide a passage from the outside surface 54 to the inside surface 58. Each plug-in opening 94 is positioned such that it intersects one of the four bus bar retaining slots 82, thereby providing access to the bus bar 14 received therein. The insulating sheath 18 is removed from a portion of the bus bar 14 immediately behind the plug-in opening 94 exposing a contact surface 98. The contact surface 98 is required for making the electrical connection with a tap-off unit installed on the electrical distribution system 10. The ribs 70 provide electrical separation between adjacent bus bars 14 in the area where the insulating sheath 18 is removed.

A finger barrier 102 covers an uninsulated edge 104 of the bus bar 14 which is normally exposed at the plug-in opening 94. The finger barrier 102 is made from an electrically insulating material, has a generally C-shaped cross-section, and is of sufficient length to span the plug-in opening 94. The finger barrier includes an outside surface 106, an inside surface 110, a first end 114 and a second end 118. The inside surface 110 is formed such that it matingly corresponds to the cross-sectional shape of the uninsulated edge 104 of the bus bar 14. The first end 114 includes an offset 122 which permits the finger barrier 102 to slightly overlap the insulating sheath 18. The finger barrier 102 also includes an alignment rib 126 which extends outwardly from the outside surface 106 at the first end 114. The alignment rib 126 is slidably received in one of the second grooves 90 nearest to the plug-in opening 94 which the finger barrier 102 spans. The alignment rib 126 assures that the finger barrier 102 is properly positioned across the plug-in opening 94 and maintains that position.

The finger barrier 102 may be an integral moulded part of the base 34 or may be a separate part semi-permanently attached to the base 34 by any appropriate means such as glue or friction, or removably attached, e.g. by snap-fit or confinement between the uninsulated edges 104 of the bus bars 14 and the base 34. The finger barrier 102 may also be retrofitted to existing bases 34 where required. Although the drawings show an embodiment with a plurality of bus bars and a plurality of finger barriers, it is to be understood that "plurality" in the appended claims means "one or more" and that protection of a single uninsulated bus bar portion is within the scope of this invention.

During the installation or removal of a tap-off unit the installer must open one of the doors 38 to permit access to the contact surfaces 98 of the bus bars 14. During the time immediately prior to the installation of a tap-off unit or immediately after the removal of a tap-off unit the uninsulated edges 104 of the bus bars 14 are normally exposed through the plug-in openings 94 and could be unintentionally contacted by the installer. To meet the requirements of IEC 439-1 Paragraph 7.4.2.2 the distribution system 10 must be deenergized, or the exposed live conductors must be protected from unintentional contact by a barrier. The finger barrier 102 provides a means to meet the requirements of IEC 439-1 paragraph 7.4.2.2 without deenergizing the system.

In conclusion, therefore, it is seen that the present invention and the embodiments disclosed herein and those covered by the appended claims are well adapted to carry out the objectives and obtain the ends set forth. Certain changes can be made in the described and claimed subject matter without departing from the spirit and scope of this invention. It is realized that changes are possible within the scope of this invention. It is further intended that each element or step recited in any of the following claims is to be understood as referring to all equivalent elements or steps. The following claims are intended to cover the invention as broadly as legally possible in whatever form its principles may be utilized.

What is claimed is:

1. An improved electrical distribution system having a plurality of bus bars, each having at least one edge and each bus bar being partially enclosed in an insulating sheath, a housing for enclosing and supporting the bus bars, a plurality of access openings spaced at intervals along the housing, each access opening providing access to an uninsulated contact surface on a bus bars for the electrical connection of a tap-off unit, and a plug-in base assembly connected to the housing and including a base having a plurality of plug-in openings for accessing the contact surfaces of the bus bars, said improvement comprising:

a plurality of finger barriers for preventing unintentional human finger contact with live bus bars proximate said plug-in openings, said finger barriers further comprising:
a body member having a first end, a second end, an inside surface, an outside surface;
each said body member attached to said base such that said member traverses one of said plug-in openings of said base.

2. The electrical distribution system of claim 1 further comprising connection means for connecting said base to said housing.

3. The electrical distribution system of claim 1 wherein said finger barriers are removably attached to the bus bars.

4. The electrical distribution system of claim 1 wherein said inside surface of each said finger barrier matingly corresponds to the cross-sectional shape of the uninsulated edge of a bus bar such that said finger barrier snugly receives the uninsulated edge of the bus bar.

5. The electrical distribution system of claim 4 wherein said finger barriers are made of an electrically insulating material and are attached to said base across said plug-in openings thereby covering the uninsulated edges of bus bars normally exposed at said plug-in openings.

6. The electrical distribution system of claim 1 wherein said base is generally rectangular in shape, made from an electrically insulating material, includes a generally flat outside surface, an inside surface, a first end, a second end, and a plurality of parallel ribs, each being generally rectangular in shape and extending outwardly from and perpendicularly to said inside surface along the longitudinal axis of said base, each said rib having a first end, a second end, and at least one surface which is in opposed relationship to at least one surface of an immediately adjacent said rib, said opposed surfaces of said immediately adjacent ribs and an intermediate portion of said inside surface of said base define a bus bar retaining slot, each said slot snugly receiving one bus bar; each pair of said opposed surfaces and said intermediate portion of said inside surface forming one said bus bar retaining slot and also including a pair of first grooves and a pair of second grooves, one of said first grooves being parallel to and juxtaposed to said first end of said adjacent ribs, the other of said first grooves being parallel to an juxtaposed to said second end of said adjacent ribs, one of said second grooves being parallel to and juxtaposed to one of said first grooves, the other of said second grooves being parallel to and juxtaposed to the other of said first grooves.

7. The electrical distribution system of claim 6 wherein each said finger barrier further includes:
an alignment rib extending outwardly from said outside surface of said first end, said alignment rib being slidably received in one of said second grooves nearest to said plug-in opening which said finger barrier spans for proper positioning of said finger barrier across said plug-in opening.

8. A finger barrier for preventing the unintentional human finger contact with an uninsulated edge portion of a bus bar of an electrical distribution system proximate a plug-in opening of the electrical distribution system, the finger barrier comprising:
a body member traversing the plug-in opening, said body member having a first end, a second end, an inside surface, and an outside surface; and the inside surface of the body member being dimensioned for receiving and covering the uninsulated edge portion of the bus bar exposed at the plug-in opening.

9. The finger barrier of claim 8 wherein the finger barrier is removably retained on the bus bar.

10. The finger barrier of claim 8 further comprising an alignment rib extending outwardly from said outside surface proximate said first end, said alignment rib being slidably received in a groove defined by the electrical distribution system containing the bus bar, said groove being proximate a plug-in opening of said electrical distribution system whereby said finger barrier traverses said plug-in opening for proper positioning across said opening.

11. An improved electrical distribution system having a plurality of bus bars, each having at least one edge and being partially enclosed in an insulation sheath, a housing for enclosing and supporting the bus bars, a plurality of access openings spaced at intervals along the housing, each access opening providing access to an uninsulated contact surface on the bus bars for electrical connection of a tap-off unit, a plug-in base assembly connected to the housing and including a base having a plurality of plug-in openings for accessing the contact surfaces of the bus bars, said improvement comprising:
a plurality of finger barriers for preventing unintentional human finger contact with live bus bars proximate said plug-in openings, each of said finger barriers further comprising:
an elongated body member being integrally formed from a portion of said base and having an outside surface and an inside surface, said inside surface conforming in shape to an edge of said bus bar; and
each said member traversing one of said plug-in openings of said base such that said member covers an uninsulated portion of said edge of one of said bus bars thereby preventing unintentional human finger contact with said uninsulated portion.

* * * * *